United States Patent
Nakamura et al.

[11] Patent Number: 5,536,589
[45] Date of Patent: Jul. 16, 1996

[54] MAGNETO-OPTICAL RECORDING MEDIUM

[75] Inventors: Hitoshi Nakamura, Kawasaki; Yujiro Kaneko, Machido, both of Japan

[73] Assignee: Ricoh Company Ltd., Tokyo, Japan

[21] Appl. No.: 410,562

[22] Filed: Mar. 23, 1995

Related U.S. Application Data

[63] Continuation of Ser. No. 222,180, Apr. 19, 1994, abandoned, which is a continuation of Ser. No. 831,999, Feb. 6, 1992, abandoned.

[30] Foreign Application Priority Data

Feb. 8, 1991 [JP] Japan ................ 3-039415

[51] Int. Cl.$^6$ .................................. G11B 5/66
[52] U.S. Cl. ............... 428/694 ML; 428/678; 428/683; 428/684 SC; 428/ 684 MT; 428/694 RE; 428/684 MM; 428/900; 428/928; 360/131; 360/134; 360/135; 365/132; 365/122
[58] Field of Search .................... 428/678, 683, 428/684 ML, 684 SC, 684 MT, 684 RE, 684 MM, 900, 928; 360/131, 134, 135; 365/132, 122

[56] References Cited

U.S. PATENT DOCUMENTS

| | | | |
|---|---|---|---|
| 4,670,356 | 6/1987 | Sato | 428/693 |
| 4,727,005 | 2/1988 | Sato | 428/693 |

FOREIGN PATENT DOCUMENTS

| | | |
|---|---|---|
| 0304873 | 3/1989 | European Pat. Off. . |
| 63-273236 | 11/1988 | Japan . |

*Primary Examiner*—Leszek Kiliman
*Attorney, Agent, or Firm*—Cooper & Dunham

[57] ABSTRACT

A magneto-optical recording medium on which rewriting is possible is composed of a substrate and a recording layer exhibiting perpendicular anisotropy formed thereon. The recording layer consists of at least a transition-metal layer and a rare-earth-metal layer, or at least two transition metal—rare earth metal alloy layers, which are alternately overlaid on each other, and each of the layers further contains a precious metal in an amount of 1 atom % to 10 atom %.

2 Claims, 1 Drawing Sheet

MAGNETO–OPTICAL RECORDING MEDIUM

This application is a continuation of Ser. No. 222,180 filed Apr. 1, 1994 which is a continuation of Ser. No. 831,999, filed Feb. 6, 1992, now both abandoned.

BACKGROUND OF THE INVENTION

1. Field of the Invention

The present invention relates to a magneto-optical recording medium on which rewriting is possible, and more particularly to a magneto-optical recording medium comprising a substrate and a recording layer exhibiting perpendicular anisotropy formed thereon, the recording layer comprising (i) at least a transition-metal layer and a rare-earth-metal layer, or (ii) at least two transition metal—rare earth metal alloy layers, which are alternately overlaid on each other, and each of the layers further comprising a precious metal in an amount of 1 atom % to 10 atom %.

2. Discussion of Background

Recently, magneto-optical recording media on which information can be written in, read out, and rewritten by means of a laser beam have been actively studied, developed and are already being used in practice. A magnetic layer exhibiting perpendicular anisotropy comprising an amorphous alloy of a rare-earth-metal and a transition-metal is conventionally used as a recording layer for such a magneto-optical recording medium. In addition, a magnetic layer formed by overlaying two amorphous alloy magnetic layers alternately, or by overlaying a rare-earth-metal layer and a transition-metal layer alternately has been proposed in order to improve the coercive force Hc, the C/N ratio and other magneto-optical characteristics of the magneto-optical recording media, as disclosed in Japanese Laid-Open Patent Applications 59-217247, 61-108112, 62-26659, 62-71041, 61-128041, 62-137753.

However, while the coercive force Hc and the C/N ratio of such a recording layer can be improved, problems exist with a lack of long-term stability, so that the coercive force Hc and the C/N ratio deteriorate with the passage of time gradually.

SUMMARY OF THE INVENTION

It is therefore an object of the present invention to provide a magneto-optical recording medium in which deterioration with time is effectively prevented while the advantages of an alternatively overlaid recording layer comprising at least a rare-earth-metal layer and a transition-metal layer or at least two rare earth metal—transition metal alloy layers are maintained.

The above object of the present invention is achieved by a magneto-optical recording medium comprising a substrate and a recording layer exhibiting perpendicular anisotropy formed thereon, the recording layer comprising at least a transition-metal layer comprising a transition metal and a rare-earth-metal layer comprising a rare earth metal or at least two transition metal—rare earth metal alloy layers, which are alternately overlaid on each other, and each of the layers further comprising a precious metal in an amount of 1 atom % to 10 atom %.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENT

Figure 1:
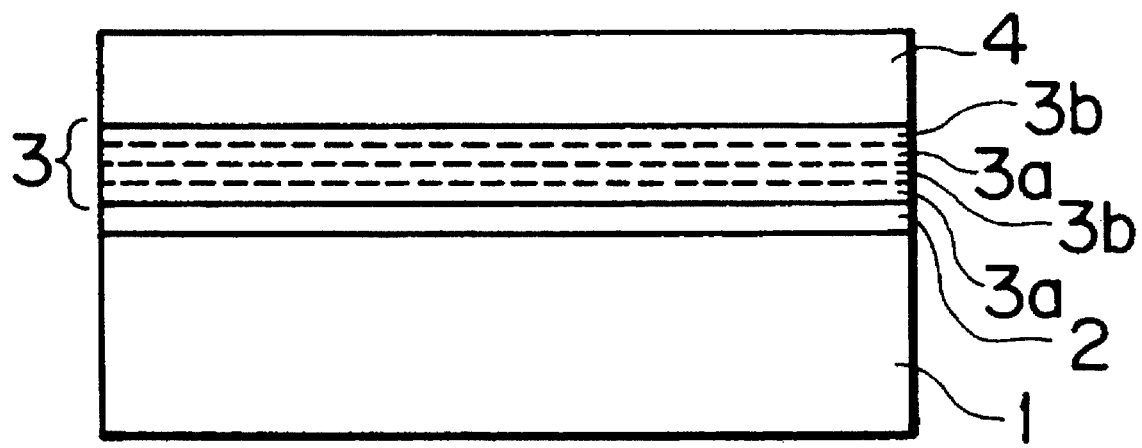
FIG. 1 is a schematic cross-sectional view of a magneto-optical recording medium according to the present invention.

The present invention will now be explained in detail with reference to FIG. 1 which shows a schematic cross-sectional view of a magneto-optical recording medium of the present invention. The magneto-optical recording medium comprises an undercoat layer 2, a recording layer 3 and a protective layer 4 overlaid in order on a substrate 1.

For instance, polycarbonate, amorphous polyolefin, polymethyl methacrylate, epoxy, glass can be employed as the materials for the substrate 1. A dielectric layer consisting of SiNx, AlN, SiOx, Si(NO)x or the like can be employed as the undercoat layer 2. The undercoat layer 2 plays the role of enhancing the magneto-optical effect and protecting the recording layer 3. The recording layer 3 comprises alternately overlaid layers of transition-metal layers 3a and rare-earth-metal layers 3b, and each of the layers 3a and 3b contains a precious metal. The same materials as used for the undercoat layer 2 can be employed for the protective layer 4. Each of the layers 2 to 4 can be formed by means of a film forming method such as the sputtering process.

The recording layer 3 which is one of the features of the structure of the present invention will now be specifically explained. The transition-metal-layer 3a comprises Fe, Co, or Ni, or an alloy comprising Fe, Co or Ni, in which a precious metal such as Au, Pt, Ag or Pd is further contained. It is preferable that the content of the precious metal be in the range of 1 atom % to 10 atom %. If the content of the precious metal is less than 1 atom %, the deterioration of the coercive force Hc and the C/N ratio of the recording layer with time cannot be improved, and if the content of the precious metal is more than 10 atom %, the initial values of C/N and θk are small, so that use of the recording layer is not practical. The rare-earth-metal layer 3b may be composed of one of Tb, Gd, Dy, Nd, Pr or Sm, or an alloy comprising at least one of these in which a precious metal such as Au, Pt, Ag or Pd is contained. It is preferable that the content of the precious metal be in the range of 1 atom % to 10 atom % for the same reason as stated above.

Though FIG. 1 shows a lamination of two transition-metal layers 3a and two rare-earth-metal layers 3b, applied alternately, the present invention is not limited to this. As required, an optional number of layers can be used to provide the requisite characteristics. Furthermore, it is preferable that the thickness of the transition-metal-layer 3a and the rare-earth-metal layer 3b be about 10 Å to 100 Å, and the entire thickness of the recording layer 3 be about 100 Å to 1000 Å.

A precious metal is contained in each of the transition-metal layer 3a and the rare earth metal layer 3b of the magneto-optical recording medium with the above structure, so that the deterioration of the coercive force Hc and the C/N ratio with time can be effectively prevented while maintaining the advantages of the alternate laminations.

In the above, alternate laminations of the transition-metal layer 3a and the rare-earth-metal layers 3b are employed as the recording layer 3, but the recording medium according to the present invention could also comprise a lamination of alternate layers of two types of transition metal—rare earth metal alloy thin films (perpendicular magnetic layer), which are alternately overlaid, each of the two layers comprising a different alloy of a transition metal and a rare earth metal, and a precious metal. In this case, alloy systems such as TbFeCo, DyFeCo, NdTbFe, NdDyFe, GdTbFeCo, GdDyFeCo, GdTbFeCo, NdDyFeCo and PrTbFeCo can be employed for the transition metal—rare earth metal alloy thin film. As a precious metal, for instance, Au, Pt, Ag or Pd can be contained in each alloy thin film. For the same reason as outlined above, it is preferable that the amount of the precious metal be in the range of 1 atom % to 10 atom %. The thickness of each alloy thin film is preferably about 10 Å to 100 Å, with the whole recording layer being about 100 Å to 1000 Å thick. The deterioration with time of the coercive force Hc and the C/N ratio of the magneto-optical recording medium with such a structure can also be prevented effectively while maintaining the advantage of the alternate laminations.

Obviously, numerous modifications and variations of the present invention are possible in light of the above teachings. It is therefore to be understood that within the scope of the appended claims, the invention may be practiced otherwise than as specifically described herein.

Other features of this invention will become apparent in the course of the following description of exemplary embodiments, which are given for illustration of the invention and are not intended to be limiting thereof.

EXAMPLE 1

A substrate made of polycarbonate with a diameter of 130 mm and a thickness of 1.2 mm was fixed to a rotatable substrate holder in a sputtering chamber.

A SiNx layer with a thickness of about 950 Å was formed as an undercoat layer on the polycarbonate substrate by an $N_2$ gas-reactive sputtering process by use of a Si target.

10 pairs of alternately overlaid layers consisting of a layer of a $Tb_{90}Pt_{10}$ alloy and a layer of a $Fe_{80}Co_{10}Pt_{10}$ alloy were then laminated, with the thickness of each pair of the alternately overlaid layers adjusted to 30 Å, on the SiNx layer by a sputtering process, using a $Tb_{90}Pt_{10}$ target and a $Fe_{80}Co_{10}Pt_{10}$ target, as the substrate holder was rotated.

A SiNx layer with a thickness of 800 Å was then overlaid on the above recording layer as a protective layer by the same method as used for forming the undercoat layer, whereby a magneto-optical recording disk No. 1 according to the present invention was fabricated.

EXAMPLES 2 to 11

The procedure for the fabrication of the magneto-optical recording disk in Example 1 was repeated except that the targets for the formation of the recording layer in Example 1 were replaced by the targets with the formulations shown in Table 1, whereby magneto-optical recording disks No. 2 to No. 11 according to the present invention were fabricated.

Comparative Examples 1 to 3

The procedure for the fabrication of the magneto-optical recording disk in Example 1 was repeated except that the targets for the formation of the recording layer in Example 1 were replaced by the targets with the formulations shown in Table 1, whereby comparative magneto-optical recording disks No. 1 to No. 3 were fabricated.

TABLE 1

|  | Formulations of Targets and Composition of Recording Layer |
| --- | --- |
| Example 1 | $Tb_{90}Pt_{10}/Fe_{80}Co_{10}Pt_{10}$ |
| Example 2 | $Tb_{99}Pt_1/Fe_{80}Co_{10}Pt_{10}$ |
| Example 3 | $Dy_{95}Pt_5/Fe_{90}Co_5Pt_5$ |
| Example 4 | $Tb_{45}Dy_{45}Pt_{10}/Fe_{87}Co_8Pt_5$ |
| Example 5 | $Tb_{30}Dy_{65}Pt_5/Fe_{90}Co_4Pt_6$ |
| Example 6 | $Tb_{90}Pd_{10}/Fe_{80}Co_{10}Au_{10}$ |
| Example 7 | $Tb_{95}Au_5/Fe_{80}Co_{10}Ag_{10}$ |
| Example 8 | $Tb_{30}Dy_{60}Au_{10}/Fe_{87}Co_8Pd_5$ |
| Example 9 | $Tb_{14}Dy_{14}Fe_{59}Co_8Pt_5/Tb_{14}Dy_{14}Fe_{58}Co_4Pt_{10}$ |
| Example 10 | $Nd_{10}Dy_{14}Fe_{56}Co_{10}Pt_{10}/Dy_{20}Fe_{68}Co_4Au_8$ |
| Example 11 | $Co_{90}Pd_{10}/Tb_{14}Dy_{14}Fe_{59}Co_8Pt_5$ |
| Comparative Example 1 | $Tb/Fe_{90}Co_{10}$ |
| Comparative Example 2 | $Tb_{99.5}Pt_{0.5}/Fe_{89.5}Co_{10}Pt_{0.5}$ |
| Comparative Example 3 | $Tb_{89}Pt_{11}/Fe_{80}Co_9Pt_{11}$ |

The dynamic properties of each of the obtained magneto-optical recording disks was evaluated by use of an evaluation apparatus (Nakamichi OMS-2000) under the following conditions:

Rate of rotation: 1800 rpm

Measurement position: R=30 mm

Recording frequency: f=3.7 MHz

Duty: 22%

Playback power: 1.5 mW

Recording/Erasure magnetic field: 1400 Oe

More specifically the bit error rate (BER) was measured by use of a disk drive, the Kerr loop was measured and the coercive force Hc and the Kerr rotation angle θk for each magneto-optical recording disk were then examined as the initial characteristics. Next, long-term accelerated aging tests were carried out at 80° C. and 85% RH, whereby the deterioration after 2000 hours of each of the bit error rate, the Kerr loop, the coercive force Hc and the Kerr rotation angle θk was examined. The results are shown in Table 2.

TABLE 2

|  | Initial Properties | | | | After 2000 hours of Long-term Accelerated Aging Tests | | | |
| --- | --- | --- | --- | --- | --- | --- | --- | --- |
|  | C/N (dB) | Hc (kOe) | θk (deg) | BER | C/N (dB) | Hc (kOe) | θk (deg) | BER |
| Ex. 1 | 50 | 10 | 0.8 | $3.0 \times 10^{-6}$ | 50 | 9.5 | 0.8 | $3.2 \times 10^{-6}$ |
| Ex. 2 | 50 | 10 | 0.7 | $3.4 \times 10^{-6}$ | 50 | 9.5 | 0.7 | $3.5 \times 10^{-6}$ |
| Ex. 3 | 49 | 12 | 0.7 | $2.8 \times 10^{-6}$ | 49 | 11 | 0.7 | $3.1 \times 10^{-6}$ |
| Ex. 4 | 50 | 10 | 0.8 | $4.5 \times 10^{-6}$ | 50 | 9.5 | 0.8 | $4.7 \times 10^{-6}$ |
| Ex. 5 | 49 | 9 | 0.7 | $5.2 \times 10^{-6}$ | 49 | 8.5 | 0.7 | $5.3 \times 10^{-6}$ |
| Ex. 6 | 50 | 8 | 0.8 | $1.8 \times 10^{-6}$ | 50 | 7.5 | 0.8 | $2.1 \times 10^{-6}$ |
| Ex. 7 | 50 | 11 | 0.7 | $1.0 \times 10^{-6}$ | 50 | 10 | 0.7 | $1.3 \times 10^{-6}$ |
| Ex. 8 | 49 | 10 | 0.8 | $2.4 \times 10^{-6}$ | 49 | 9.5 | 0.8 | $2.3 \times 10^{-6}$ |
| Ex. 9 | 51 | 8 | 0.8 | $3.1 \times 10^{-6}$ | 51 | 8.0 | 0.8 | $3.2 \times 10^{-6}$ |
| Ex. 10 | 48 | 7 | 0.9 | $3.1 \times 10^{-6}$ | 48 | 7.0 | 0.9 | $2.9 \times 10^{-6}$ |
| Ex. 11 | 47 | 2 | 1.2 | $5.4 \times 10^{-6}$ | 47 | 2.0 | 1.2 | $5.5 \times 10^{-6}$ |
| Com. Ex. 1 | 49 | 7 | 0.7 | $2.0 \times 10^{-6}$ | 44 | 2 | 0.3 | $1.4 \times 10^{-5}$ |
| Com. Ex. 2 | 50 | 8 | 0.7 | $3.1 \times 10^{-6}$ | 46 | 3 | 0.3 | $3.1 \times 10^{-5}$ |
| Com. Ex. 3 | 45 | 11 | 0.5 | $2.4 \times 10^{-6}$ | 45 | 11 | 0.5 | $3.0 \times 10^{-6}$ |

The results shown in Table 2 clearly demonstrate that the C/N ratio, the Hc and the θk of each of the magneto-optical recording disks containing the precious metals in Examples 1 through 11 little deteriorate, and BER in particular shows almost no deterioration, so that the deterioration with time of these magneto-optical recording disks according to the present invention is effectively prevented. As compared with the recording disks fabricated in Examples 1 to 11, the properties of the comparative magneto-optical recording disk No. 1 in Comparative Example 1 significantly deteriorated. The amount of the precious metal contained in the magneto-optical recording disk in Comparative Example 2 is so small that the deterioration of the properties is conspicuous. Furthermore, because an excessive amount of a precious metal was added to the comparative magneto-optical recording disk No. 3 in Comparative Example 3, the initial values of the C/N ratio and the θk are low. Therefore, such a magneto-optical recording disk is not practical.

As specifically explained in the foregoing, the magneto-optical recording medium of the present invention comprising alternate laminations as the recording layer, in which a fixed amount of a precious metal is contained, is capable of preventing the deterioration with time of the Hc, the θk or other properties while maintaining the advantage of the alternate laminations, so that high reliability of the magneto-optical recording medium over the long term can be provided.

What is claimed is:

1. A magneto-optical recording medium comprising a substrate and a recording layer exhibiting perpendicular anisotropy formed thereon, said recording layer consisting essentially of a transition-metal layer comprising at least one transition metal selected from the group consisting of Fe and Co and a rare-earth-metal layer comprising at least one rare earth metal selected from the group consisting of Tb, Dy and Nd, which are overlaid, and each of said transition metal layer and said rare-earth-metal layer further comprising Pt in an amount of 1 atom % to 10 atom %.

2. A magneto-optical recording medium comprising a substrate and a recording layer exhibiting perpendicular anisotropy formed thereon, said recording layer consisting essentially of two transition metal—rare earth metal alloy layers, which are overlaid, each layer comprising a different alloy of at least one transition metal selected from the group consisting of Fe and Co and at least one rare earth metal selected from the group consisting of Tb, Dy and Nd, and Pt in an amount of 1 atom % to 10 atom %.

* * * * *